United States Patent Office 2,772,755
Patented Dec. 4, 1956

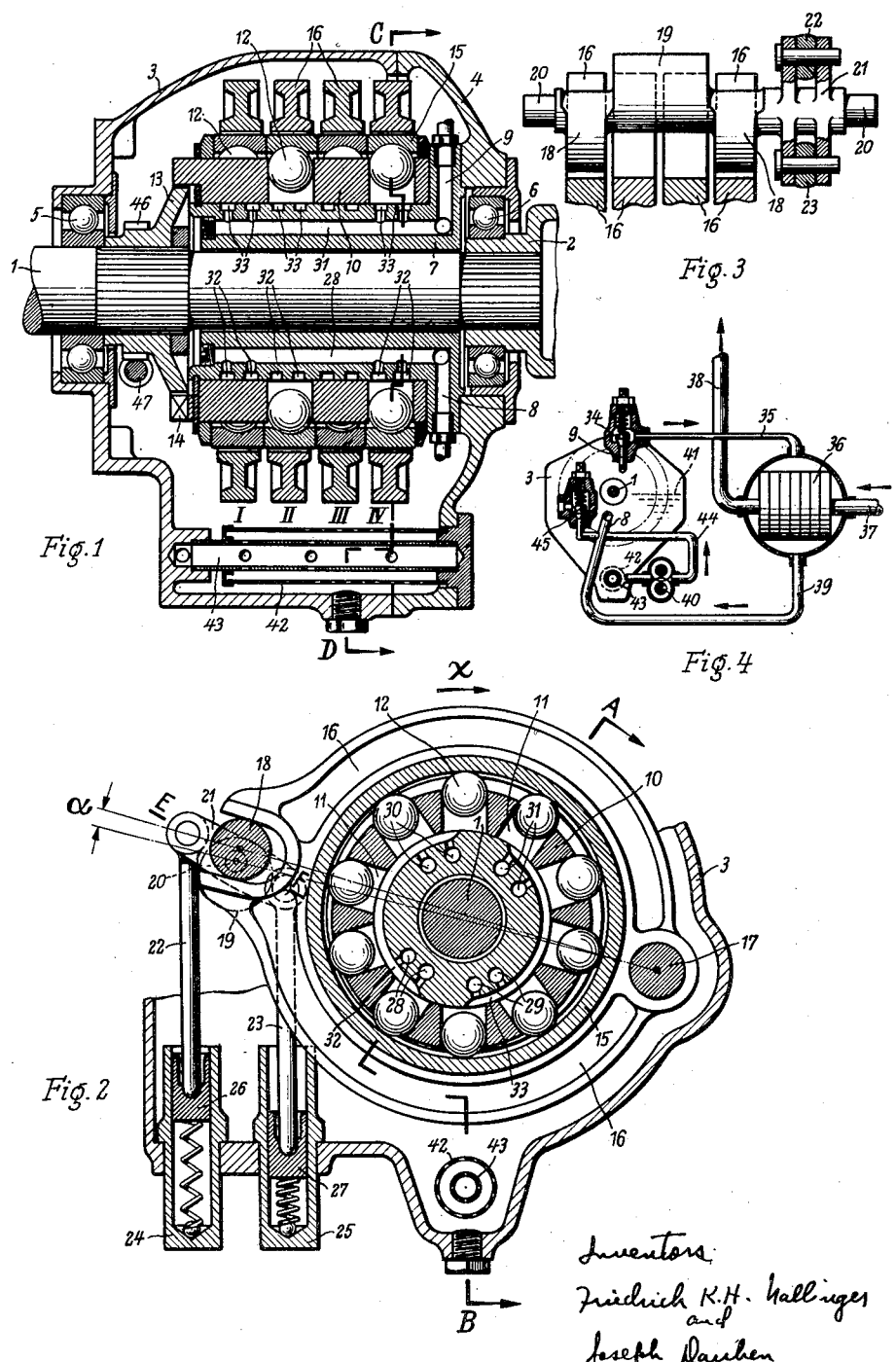

2,772,755

PUMP TYPE HYDRAULIC BRAKE

Friedrich K. H. Nallinger and Joseph Dauben, Stuttgart, Germany, assignors to Daimler-Benz Aktiengesellschaft, Stuttgart-Unterturkheim, Germany Application July 6, 1951, Serial No. 235,522

Claims priority, application Germany July 13, 1950

9 Claims. (Cl. 188—91)

The invention relates to a hydraulic-mechanical brake, particularly for motor vehicles.

One object of the invention is a brake which is also particularly adapted for heavy vehicles.

A further object of the invention is a brake which renders a soft progressive and effective braking possible.

A further object of the invention refers to the utilization of the braking heat which is produced during the braking.

A further object of the invention is a brake which functions with as little friction and loss as possible.

An essential characteristic of the invention consists in constructing the brake as an eccentric pump with adjustable eccentricity in such a manner that a resultant radial force arises which is dependent on the eccentricity and which is utilized as brake force.

According to a further characteristic of the invention for compensation of unilateral brake pressures provision is made for two eccentric pumps with opposite eccentricity thereby producing oppositely acting resultant pressures which cancel each other in radial direction entirely or substantially. Particularly advantageous is a brake unit with at least four eccentric pumps which are arranged axially side by side and which are adjusted in such a manner that the eccentricity of the eccentric pumps located in the middle is in each case opposite to that of the two external eccentric pumps.

It can be achieved thereby that—similarly as in a multicylinder reciprocating engine—both all forces and all bending couples which act on the shaft and which arise as a result of the unilateral effect of the pressures as well as of forces due to inertia can practically be balanced.

In accordance with a further charcteristic of the invention there are radial pistons for the generation of the brake pressure which transmit the pump pressure to an outer eccentric annular member which, in turn, transmits it to a brake member which is non-rotary and adjustable with the eccentric annular member. In accordance with a further characteristic of the invention the pump pistons can hereby be constituted by balls which are guided in radial cylinder guides and are caused by centrifugal force to engage the outer eccentric member rolling on the same in the manner of the balls of a ball bearing and producing a pumping effect when the hydraulic brake is applied by eccentric adjustment of the annular member.

According to further characteristics of the invention the eccentric annular member is preferably loosely mounted in the non-rotary brake member so that when the brake is released by co-axial adjustment of the annular member the latter is supported freely suspended by the pump pistons, particularly balls. Preferably also the pump which rotates rotor-disposed between an inner stationary control valve and the outer brake member is radially loosely coupled with the shaft to be braked so that it can adjust itself free from force between the valve and the brake member.

Through this the advantage is achieved that when the brake is released practically no friction at all arises in the brake. As a result normally an operation of the brake substantially free from losses and without friction, noise or free forces due to inertia can be achieved. The annular member which is in this case co-axially adjusted runs between oil films in a floating and balanced manner.

Further objects and characteristics of the invention will appear from the following description of an example of construction.

Fig. 1 shows an axial longitudinal section through the brake unit taken along the line A—B of Fig. 2, Fig. 2 shows a cross section through the brake unit taken along the line C—D of Fig. 1, Fig. 3 shows a section taken along the line E—F of Fig. 2, and Fig. 4 shows a hydraulic circuit diagram of the brake with means for utilizing the braking heat which is produced during the braking action.

In the drawing 1 is the shaft to be braked, e. g. the extended end of the change speed gear main shaft from which the power is transmitted, for example, to the rear axle of a motor vehicle through a coupling member which is indicated at 2. The shaft 1 is supported in the two-part casing 3, 4 by two ball bearings 5 and 6. To the rear cover-like casing part 4 co-axially to the shaft 1 and with radial play relative to the latter a control valve 7 is flanged which is connected to a suction pipe 8 and to a pressure pipe 9. On the outer cylindrical annular surface of this valve the pump rotor 10 is journalled which includes the cylinders 11 of four pumps I, II, III and IV which are located side by side.

In the example of construction particularly shown in Fig. 2, provision is made in each of the four pump units for ten radial cylinders so that the brake works with a total of 40 cylinders. As pump pistons there serve balls 12 which are snugly fitted into the cylinders 11 sliding with as little friction as possible in the cylinders while effectively sealing the pressure side from the suction side of the pump. The cylinders 11 of neighboring pump units are suitably staggered in circumferential direction to each other so that the balls 12 of any pump unit are in axial registry with a point located between the balls of the adjacent pump units.

The pump rotor 10 is on its front side coupled with the shaft 1 by a disk 13 and by means of teeth 14 in such a manner that the pump rotor as a whole rotates together with the shaft 1 but can adjust itself freely in radial direction with respect to the shaft 1.

The balls 12 bear against the annular members 15 on which they roll under the effect of the centrifugal force like balls of a ball bearing roll on the outer race of the latter. Each of the four annular members 15 is surrounded by an external brake member 16. These four brake members are supported on one side of the casing on a common pivot 17 and can be rocked through the angle α by means of eccentric cams 18 and 19 fixed to a common shaft 20 journalled in the casing on the other side thereof, whereby the brake members may be adjusted from a co-axial position to an eccentric position relative to the rotor or vice versa.

The rotation of the eccentric shaft 20 for the variation of the angle α which determines the eccentricity is effected by rocking a cross-head 21 which is fastened to the shaft 20, the piston rods 23 and 22 of the pistons 26 and 27 which are sliding in the cylinders 24 and 25 being pivoted to the ends of the cross head. The cylinders 24 and 25 are mounted in the brake casing 3 and can be alternately supplied with fluid under pressure from the driver's seat by suitable means.

In the distributing valve 7 longitudinally extending suction conduits 28 and 29, which are in connection with the suction pipe 8, as well as pressure conduits 30, 31 are bored which are connected to the pressure pipe 9. Furthermore, at the circumference of the distributing valve 7 within the range of each unit pump grooves 32 and 33 are provided each of which extends almost around half the circumference of the distributing valve being substantially symmetrical to a straight line through the axes of the shafts 17 and 20. The grooves 32 of the pumps II and III communicate with the pressure conduits 30, the grooves 33 of the pumps I and IV communicate with the pressure conduits 31, and the grooves 33 of the eccentric pumps II and IV communicate with the suction conduits 29.

The four eccentric pumps which form the brake work in the following manner:

Let it be assumed that, as shown in Fig. 2, the brake be adjusted to highest braking power, i. e. greatest eccentricity α. By the eccentrics 18 the brake rings 16 of the pumps I and IV are rocked clockwise about the trunnion 17 and the eccentrics 19 the rings 16 of the eccentric pumps II and III have been rocked in the opposite sense. If the shaft 1 and with it the pump rotor 10 turns in the direction of the arrow x, the balls 12 of the eccentric pumps I and IV suck in the braking fluid from the grooves 32 and from the suction pipe 8 through the suction conduits 28 and press it on the opposite side of the pump into the grooves 33 and the pressure conduits 21 into the pressure pipe 9. Inversely the grooves 33 of the eccentric pumps II and III act as suction grooves and the grooves 32 of these pumps function as pressure grooves, sucking in the liquid from the suction pipe 8 through the conduits 29 and conveying it through the conduits 30 to the pressure conduit 9.

Owing to the opposite eccentricity of the pumps I, IV on one hand and of the pumps II, III on the other hand a complete balance of the forces and couples within the unit is achieved, not only the radial forces but also the couples acting about an axis transverse to the shaft 1 cancelling each other; the balance is achieved both with respect to the hydraulic pressure forces and also with respect to the centrifugal forces of the balls 12 which differ because of the difference of the effective radii.

As Fig. 4 shows, the liquid fed by the pumps is conducted to a pressure control valve 34 through the pipe 9 which pressure control valve is under the effect of an adjustable relatively strong regulating spring and permits passage of the liquid when the pressure thereof exceeds the pressure which is set up by the spring.

The liquid is then conveyed by a pipe 35 to a heat exchanger 36 where the heat which was imparted to it by the work of the brake is transferred to a heating medium, e. g. the cooling water of the engine which is utilized for this purpose and which flows in at 37 and flows off at 38. The brake liquid which is cooled in this manner flows then through a pipe 39 back to the suction pipe 8 and to the brake. In order to guarantee a steadily filled circulation system and to compensate for leakage losses provision is made for an oil or transfer pump 40 which sucks in the oil which fills the sump of the casing 3 up to a certain oil level through a suction pipe 43 which is arranged in the lowermost part of the casing and is surrounded by a filter 42 and conveys it to the suction pipe 8 of the brake through a transfer pipe 44. In order to press the balls 12 against the rings 15 when shaft 1 is at rest or runs slowly, provision is made for the maintenance within the braking system of a certain minimum pressure. For this purpose an overflow valve 45 is arranged which serves for the maintenance of this minimum pressure difference between the suction pipe 8 and the interior of the casing. If this pressure is exceeded, the valve 45 opens and the excess liquid can flow out to the casing 3. The pump 40 is driven, for example, by the clutch disk 13 for the pump rotor which for this purpose can be provided with teeth 46 by which the pump shaft 47 is driven.

The invention is not restricted to the illustrated details of construction but it can be modified within the scope of the appended claims.

What we claim is:

1. In a vehicle, the combination with a member connected with the vehicle wheels to be driven thereby of a pump of the variable delivery type, said pump comprising a rotor connected to said member to be driven thereby, at least two stators surrounding said rotor, means for mounting each of said stators for adjustment between a co-axial non-feeding position and an eccentric feeding position relative to said rotor, and means for adjusting said stators in opposite directions.

2. In a vehicle, the combination with a member connected with the vehicle wheels to be driven thereby of a pump of the variable delivery type, said pump comprising a rotor connected to said member to be driven thereby, four annular stators surrounding said rotor and located in adjacent axial relationship to each other and constituting an inner pair of stators and an outer pair of stators, means for mounting each of said stators for adjustment between a co-axial non-feeding position and an eccentric feeding position relative to said rotor, and means for simultaneously adjusting said pairs in opposite directions from said coaxial position.

3. The combination claimed in claim 1 in which said rotor is provided with radial cylinder bores, piston members being slidable in said bores and adapted to be engaged and reciprocated by said stators.

4. The combination claimed in claim 2 in which said rotor is provided with four circumferential series of radial bores, spherical piston members being guided in said bores, each of said series being surrounded by one of said stators, the latter engaging said spherical piston members.

5. In a hydraulic brake, the combination comprising a rotor having a plurality of circumferential series of radial cylinder bores, balls guided in said bores, ball race rings surrounding said series of balls and arranged in side-by-side relationship and comprising at least one inner pair and one outer pair of race rings, means for simultaneously adjusting said pairs of race rings in opposite directions from a co-axial position relative to said rotor to eccentric position relative thereto and vice versa, an inlet conduit, an outlet conduit, and means for controlling the communication between said conduits and said cylinder bores.

6. The combination claimed in claim 5 in which said cylinder bores of adjacent series are located out of axial registry with each other.

7. The combination claimed in claim 2 in which said means comprise a common rod pivotally supporting said stators, a common rotatable cam shaft extending parallel to said rod and provided with eccentric cams engaging and adapted to adjust said stators, and means for rotatably adjusting said cam shaft.

8. In a vehicle, the combination with a member driven by the wheels of the vehicle, of a pump of the variable delivery type, said pump comprising a rotor connected to said member to be driven thereby and provided with a plurality of radial bores, spherical elements movably mounted in said bores and adapted to variably confine said bores, a stator surrounding said rotor and composed of a race ring adapted to engage and actuate said spherical elements and of an adjustable support in which said race ring is mounted, means for adjusting said support from a co-axial non-feeding position to an eccentric feeding position relative to said rotor and vice versa, a pressure conduit, a suction conduit, and means operable by the relative rotation of said rotor and said stator and adapted to connect each of said bores alternately to said conduits and to thereby produce a continuous circulation of fluid through said conduits, said last-mentioned means comprising a stationary valve member mounted in contact with said rotor and provided with ducts for intermittent communication with said bores.

9. In a vehicle, the combination with a member driven by the wheels of the vehicle, of a pump of the variable delivery type, said pump comprising a rotor connected to said member to be driven thereby and provided with a plurality of radial bores, spherical elements movably mounted in said bores and adapted to variably confine said bores, a stator surrounding said rotor and composed of a race ring adapted to engage and actuate said spherical elements and of an adjustable support in which said race ring is mounted, means for adjusting said support from a co-axial non-feeding position to an eccentric feeding position relative to said rotor and vice versa, a pressure conduit, a suction conduit, and means operable by the relative rotation of said rotor and said stator and adapted to connect each of said bores alternately to said conduits and to thereby produce a continuous circulation of fluid through said conduits, said last-mentioned means comprising a stationary cylindrical valve member on which said rotor is journalled, said valve member being provided with ducts for intermittent communication with said bores, said ducts communicating with said conduits.

References Cited in the file of this patent

UNITED STATES PATENTS

| | | |
|---|---|---|
| 1,649,347 | Hardt | Nov. 15, 1927 |
| 2,062,670 | Luebkert | Dec. 1, 1936 |
| 2,064,421 | Erskine | Dec. 15, 1936 |
| 2,232,252 | Mathey | Feb. 18, 1941 |
| 2,416,638 | Morton | Feb. 25, 1948 |
| 2,452,550 | Cline | Nov. 2, 1948 |
| 2,496,497 | Russell | Feb. 7, 1950 |
| 2,511,518 | Stephens | June 13, 1950 |
| 2,548,919 | Stevens et al. | Apr. 17, 1951 |

FOREIGN PATENTS

| | | |
|---|---|---|
| 274,489 | Great Britain | Dec. 8, 1927 |